(12) United States Patent
Yang et al.

(10) Patent No.: US 9,158,153 B2
(45) Date of Patent: Oct. 13, 2015

(54) BOTTOM CHASSIS, BACK LIGHT UNIT HAVING THE SAME, AND DISPLAY APPARATUS HAVING THE SAME

(75) Inventors: Sang Sik Yang, Asan-si (KR); Jungki Kim, Cheonan-si (KR); Kwang-Ho Park, Seongnam-si (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 801 days.

(21) Appl. No.: 13/355,839

(22) Filed: Jan. 23, 2012

(65) Prior Publication Data

US 2013/0050987 A1    Feb. 28, 2013

(30) Foreign Application Priority Data

Aug. 22, 2011  (KR) ................ 10-2011-0083612

(51) Int. Cl.
*G02F 1/13357* (2006.01)
*G02F 1/1335* (2006.01)
*G02F 1/1333* (2006.01)

(52) U.S. Cl.
CPC .... *G02F 1/133608* (2013.01); *G02F 1/133615* (2013.01); *G02F 2001/133314* (2013.01); *G02F 2001/133628* (2013.01); *G02F 2201/36* (2013.01); *G02F 2201/54* (2013.01)

(58) Field of Classification Search
CPC ................... G02F 1/133608; G02F 1/133308; G02F 2001/133317; G02F 2001/133314; G02F 2001/13332; G02F 2001/133328
See application file for complete search history.

(56) References Cited

U.S. PATENT DOCUMENTS

| | | | |
|---|---|---|---|
| 6,580,477 B1 * | 6/2003 | Cho | 349/65 |
| 2004/0057227 A1 * | 3/2004 | Yang et al. | 362/31 |
| 2007/0146571 A1 * | 6/2007 | Nakagawa et al. | 349/58 |

FOREIGN PATENT DOCUMENTS

| | | |
|---|---|---|
| JP | 2009-139704 | 6/2009 |
| KR | 1020050051360 | 6/2005 |
| KR | 1020090117329 | 11/2009 |

* cited by examiner

*Primary Examiner* — Julie Bannan
(74) *Attorney, Agent, or Firm* — F. Chau & Associates, LLC

(57) ABSTRACT

A bottom chassis includes a bottom portion having at least one deformation-preventing region therethrough and a sidewall portion connected to at least one side of the bottom portion. The bottom portion includes a first side extending along a first direction and a second side extending along a second direction crossing the first direction. The first direction is substantially perpendicular to a longitudinal direction of the at least one deformation-preventing region, and the second direction is substantially parallel to the longitudinal direction of the at least one deformation-preventing region.

21 Claims, 14 Drawing Sheets

BOTTOM CHASSIS, BACK LIGHT UNIT HAVING THE SAME, AND DISPLAY APPARATUS HAVING THE SAME

CROSS-REFERENCE TO RELATED APPLICATIONS

This U.S. non-provisional patent application claims priority under 35 U.S.C. §119 to Korean Patent Application No. 10-2011-0083612, filed on Aug. 22, 2011, the disclosure of which is hereby incorporated by reference herein in its entirety.

BACKGROUND OF THE INVENTION

Embodiments of the inventive concept relate to a display device, and more particularly, to a bottom chassis, a back light unit having the same, and a display apparatus having the same.

A liquid crystal display device is a display device which may convey information in visible form from electronic devices to human viewers. The liquid crystal display device may include a display panel displaying information, a light source supplying a light to the display panel, and a driving portion controlling the display panel.

The display panel of the liquid crystal display device is not self-luminous. Therefore, the liquid crystal display device may further include a light source, in addition to the display panel, and the transmittance of a light provided from the additional light source can be controlled by the display panel. This control allows for the liquid crystal display device to display information.

A variety of light sources may be used for the liquid crystal display device, but the resulting heat emission from the light source may lead to a deformation or malfunction of the liquid crystal display device.

SUMMARY

Example embodiments of the inventive concepts provide a bottom chassis with an increase deformation resistance property.

Example embodiments of the inventive concepts provide a backlight unit including the bottom chassis.

Example embodiments of the inventive concepts provide a display device including the bottom chassis.

According to an example embodiment of the inventive concept, a bottom chassis may include a bottom portion having at least one deformation-preventing region therethrough, and a sidewall portion connected to at least one side of the bottom portion. The bottom portion may include a first side extending along a first direction and a second side extending along a second direction crossing the first direction. The first direction may be parallel to a longitudinal direction of the at least one deformation-preventing region, and the second direction may be substantially parallel to the longitudinal direction of the at least one deformation-preventing region.

In some embodiments, the bottom portion further may include a third side facing the first side and a fourth side facing the second side. The at least one deformation-preventing region may include at least one slit located between a center point of the bottom portion and the second side, and/or at another point located between the center point of the bottom portion and the fourth side. The center point of the bottom portion is spaced apart from the second side by about half a length of the first side.

In an embodiment, one slit is located between a first line which crosses the bottom chassis in a direction substantially parallel to the second direction and a second line which crosses the bottom chassis in a direction substantially parallel to the second direction. The first line is spaced apart from the second side by about one-eighth of the length of the first side and the second line is spaced apart from the second side by about two-fifths of the length of the first side.

In an embodiment, the at least one deformation-preventing region may include a first deformation-preventing region and a second deformation-preventing region. The first deformation-preventing region may be a slit located between a first line which crosses the bottom chassis in a direction substantially parallel to the second direction and a second line which crosses the bottom chassis in a direction substantially parallel to the second direction. The first line and the second line are spaced apart from the second side by about one-eighth of the length of the first side and the second line is spaced apart from the second side by about two-fifths of the length of the first side, and the second deformation-preventing region may be a slit located between a third line which crosses the bottom chassis in a direction substantially parallel to the second direction and a fourth line which crosses the bottom chassis in a direction substantially parallel to the second direction. The third line is spaced apart from the fourth side by about one-eighth of the length of the first side and the fourth line is spaced apart from the fourth side by about two-fifths of the length of the first side.

According to an example embodiment of the inventive concept, a backlight unit may include the afore-described bottom chassis and a light source portion equipped in the bottom chassis.

According to an example embodiment of the inventive concept, a display device may include the afore-described bottom chassis, a display panel disposed in the bottom chassis, and a light source portion equipped in the bottom chassis to face a sidewall of the display panel.

According to an example embodiment of the inventive concept, a bottom chassis is provided. The bottom chassis includes a bottom portion having a tetragonal shape and which includes a first side extending along a first direction, a second side extending along a second direction crossing the first direction, a third side parallel to the first side and a fourth side parallel to the second side. The bottom portion has a first slit and a second slit penetrating therethrough, with the first slit being located between a center point of the bottom portion and the second side of the bottom portion and the second slit is located between the center point of the bottom portion and the fourth side of the bottom portion. The first and second slits are spaced apart from the first side and the third side by substantially a same distance as each other. The bottom chassis further includes a sidewall portion connected to the first side, the second side, the third side, and the fourth side of the bottom portion, and a plurality of light shielding tapes disposed on an outer surface of the bottom chassis and covering the first and the second slits. The first direction is substantially perpendicular to a longitudinal direction of the first and second slits and the second direction is substantially parallel to the longitudinal direction of the first and second slits.

BRIEF DESCRIPTION OF THE DRAWINGS

Example embodiments can be more clearly understood from the following detailed description when taken in conjunction with the accompanying drawings in which.

DETAILED DESCRIPTION

Example embodiments of the inventive concept will now be described more fully with reference to the accompanying drawings, in which example embodiments are shown.

A bottom chassis of a display device according to an example embodiment of the inventive concept will be described with reference to FIGS. 1A and 1B.

Figure 1A:
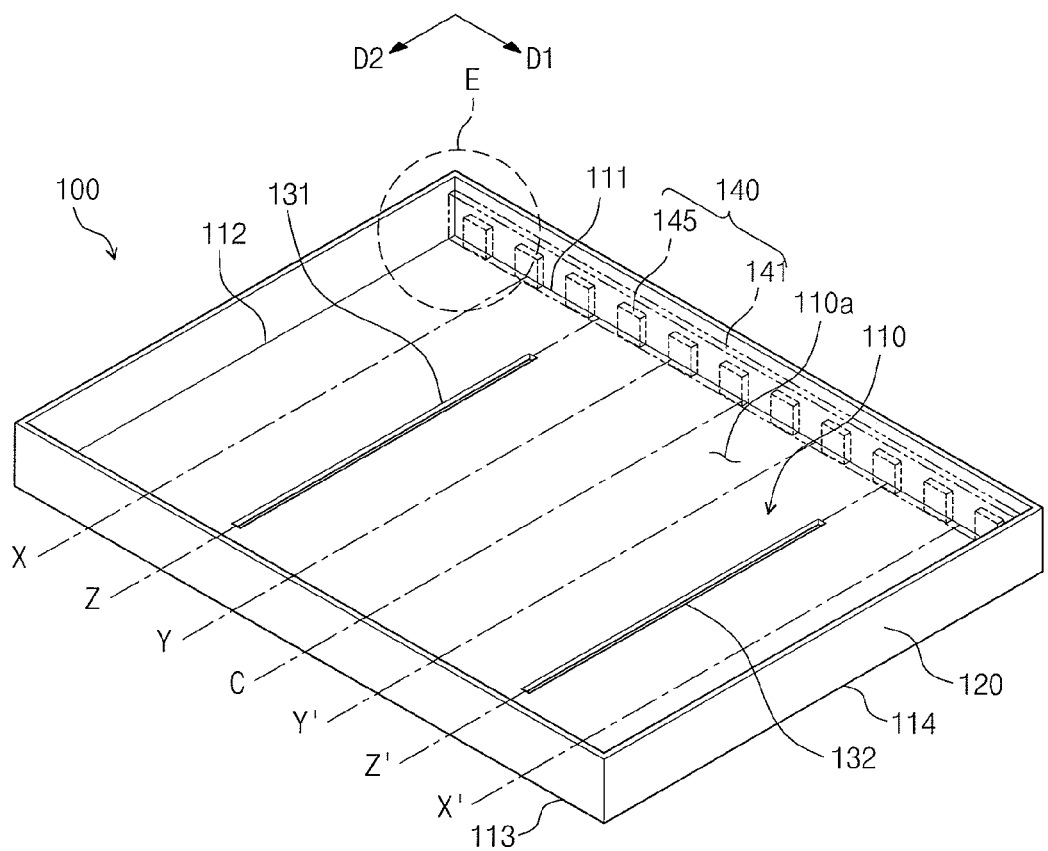
FIG. 1A is a perspective view of a bottom chassis according to an example embodiment of the inventive concept.
Figure 1B:
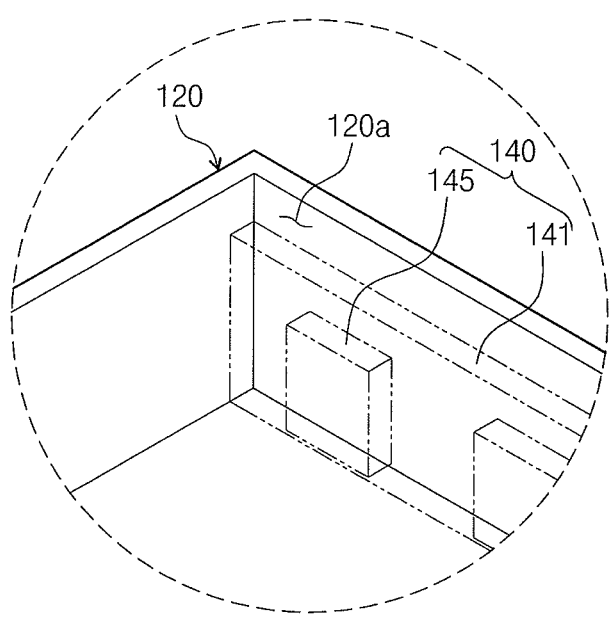
FIG. 1B is an enlarged perspective view of a portion E of FIG. 1A.

FIG. 1A is a perspective view of a bottom chassis according to an example embodiment of the inventive concept, and FIG. 1B is an enlarged perspective view of a portion E of FIG. 1A.

Referring to FIGS. 1A and 1B, a bottom chassis 100 may include, for example, a bottom portion 110 and a sidewall portion 120. The bottom portion 110 may have a bottom surface 110a. The bottom surface 110a may be shaped like, for example, a tetragonal plate with four sides, and the sidewall portion 120 may be connected to the sides of the bottom surface 110a. For example, the sidewall portion 120 may be vertically connected to the bottom surface 110a. The sidewall portion 120 may be connected to all or part of the sides of the bottom surface 110a. The bottom portion 110 may include, for example, a first side 111 extending along a first direction D1 and a second side 112 extending along a second direction D2 crossing the first direction D1. In addition, the bottom portion 110 may further include, for example, a third side 113 parallel to the first side 111 and a fourth side 114 parallel to the second side 112.

The display device may include a light source portion 140, which is disposed on, for example, an inner side surface 120a of the sidewall portion 120 or on the bottom surface 110a adjacent to the inner side surface 120a, along the first direction D1. For example, the light source portion 140 may include a plurality of light sources 145 and a bar 141 provided with the light sources 145. The light sources 145 may be arranged spaced apart from each other along the first direction D1. The bar 141 may be configured to apply a driving voltage to the light sources 145.

The bottom chassis 100 may include at least one deformation-preventing region, which may be formed in the bottom surface 110a. Due to the presence of the deformation-preventing region, it is possible to prevent the display device from being deformed by a thermal stress. In an example embodiment, the deformation-preventing region may be formed to penetrate the bottom portion 110 thereby forming a through hole penetrating the bottom portion 110. For example, the deformation-preventing region may be formed to penetrate the bottom portion 110 along the second direction D2. In this case, the first and second directions D1 and D2 may correspond to width and length directions of the deformation-preventing region, respectively.

In an embodiments, the deformation-preventing region may be formed at one or more points located between a center point of the bottom portion 110 and the second side 112 and at one or more points located between the center point and the fourth side 114. The center point of the bottom portion 110 may be spaced apart from the second or fourth side 112 or 114 by half a length of the first side 111.

For example, the deformation-preventing region may include first and second deformation-preventing regions 131 and 132, which are shaped like slits penetrating the bottom portion 110.

In an embodiment, one of the first and second deformation-preventing regions 131 and 132, such as for example, the first deformation-preventing region 131 may be located between the central line C passing through the center point of the bottom portion 110 and the second side 112. The other of the first and second deformation-preventing regions 131 and 132, such as for example, the second deformation-preventing region 132 may be located between the fourth side 114 and the central line C passing the center point of the bottom portion 110.

The first deformation-preventing region 131 may be located, for example, between a first line X which crosses the bottom chassis 100 in a direction parallel to the second direction D2 and a second line Y which crosses the bottom chassis 100 in a direction parallel to the second direction D2. The first line X and the second line Y are spaced apart from the second side 112 by one-eighth and two-fifths, respectively, of the length of the first side 111. For example, the first deformation-preventing region 131 may be formed on a third line Z which crosses the bottom chassis 100 in a direction parallel to the second direction D2 and which is spaced apart from the second side 112 by one-fourth of the length of the first side 111.

The second deformation-preventing region 132 may be located, for example, between a fourth line X' which crosses the bottom chassis 100 in a direction parallel to the second direction D2 and a fifth line Y' which crosses the bottom chassis 100 in a direction parallel to the second direction D2. The fourth line X' and the fifth line Y' are spaced apart from the fourth side 114 by one-eighth and two-fifths, respectively, of the length of the first side 111. For example, the second deformation-preventing region 132 may be formed on a sixth line Z' which crosses the bottom chassis 100 in a direction parallel to the second direction D2 and which is spaced apart from the fourth side 114 by one-fourth of the length of the first side 111.

In the second direction D2, the first and second deformation-preventing regions 131 and 132 are spaced apart from the first side 111 and the third side 113 by, for example, the same distance. Alternatively, one of the first and second deformation-preventing regions 131 and 132 may be shifted toward one of the first and third sides 111 and 113. It is noted that example embodiments of the present invention are not limited to the above design and positions for the first and second deformation-preventing regions 131 and 132 but rather the design of the first and second deformation-preventing regions 131, 132 may be varied and the positions for the first and second deformation-preventing regions 131 and 132 in the bottom portion 110 of the bottom chassis 100 relative to the first, second, third, fourth sides, 111, 112, 113, and 114, respectively of the bottom portion 110 may also be varied in accordance with example embodiments of the present invention.

Figure 2:
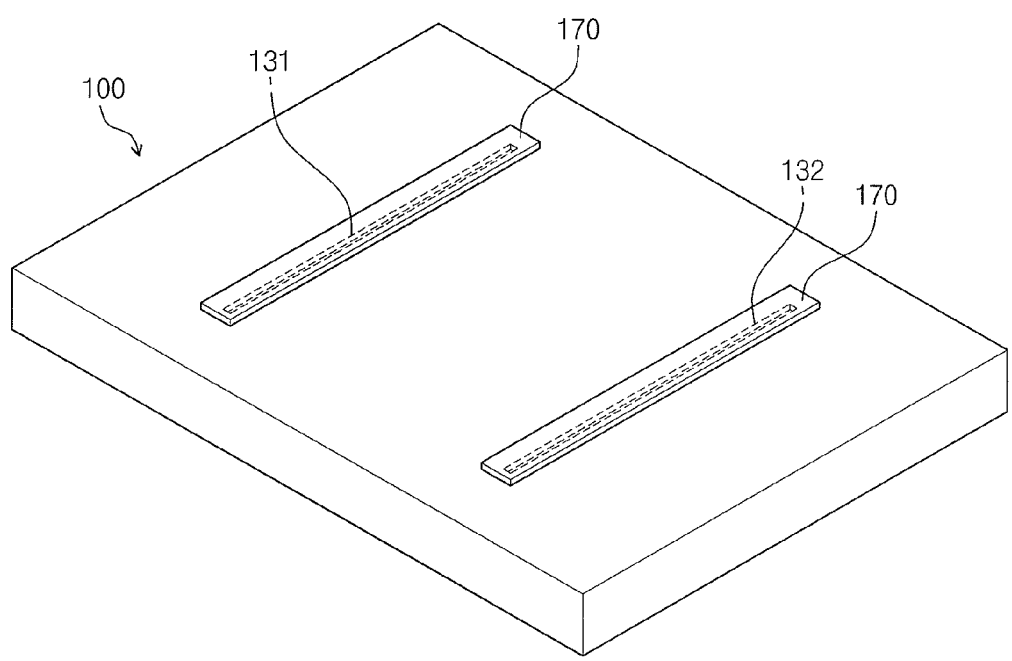
FIGS. 2 through 6 are perspective views of a bottom chassis according to an example embodiment of the inventive concept.

A bottom chassis of a display device according to an example embodiment of the inventive concept will be described with reference to FIG. 2. FIG. 2 is a perspective view of a bottom chassis according an example embodiment of the inventive concept. For concise description, a previously described element may be identified by a similar or identical reference number without repeating an overlapping description thereof.

Referring to FIG. 2, the light source portion 140 of the display device may be disposed on the inner side surface 120a of the sidewall portion 120 adjacent to the bottom surface 110a, along the first direction D1. For example, the light source portion 140 may be disposed on the inner side surface 120a of the sidewall portion 120 adjacent to the first side 111 and/or the third side 113.

The bottom chassis 100 may include, for example, the first and second deformation-preventing regions 131 and 132 for preventing the display device from being deformed by a thermal stress. In addition, the bottom chassis 100 may further include, for example, light shielding members 170 disposed on an outer surface of the bottom chassis 100 to face the first and second deformation-preventing regions 131 and 132. The light shielding members 170 may be configured to prevent a light generated from the light source portion 140 from being emitted by the first and second deformation-preventing regions 131 and 132. In an embodiment, the light shielding members 170 may be provided in the form of, for example, a light shielding tape.

Figure 3:
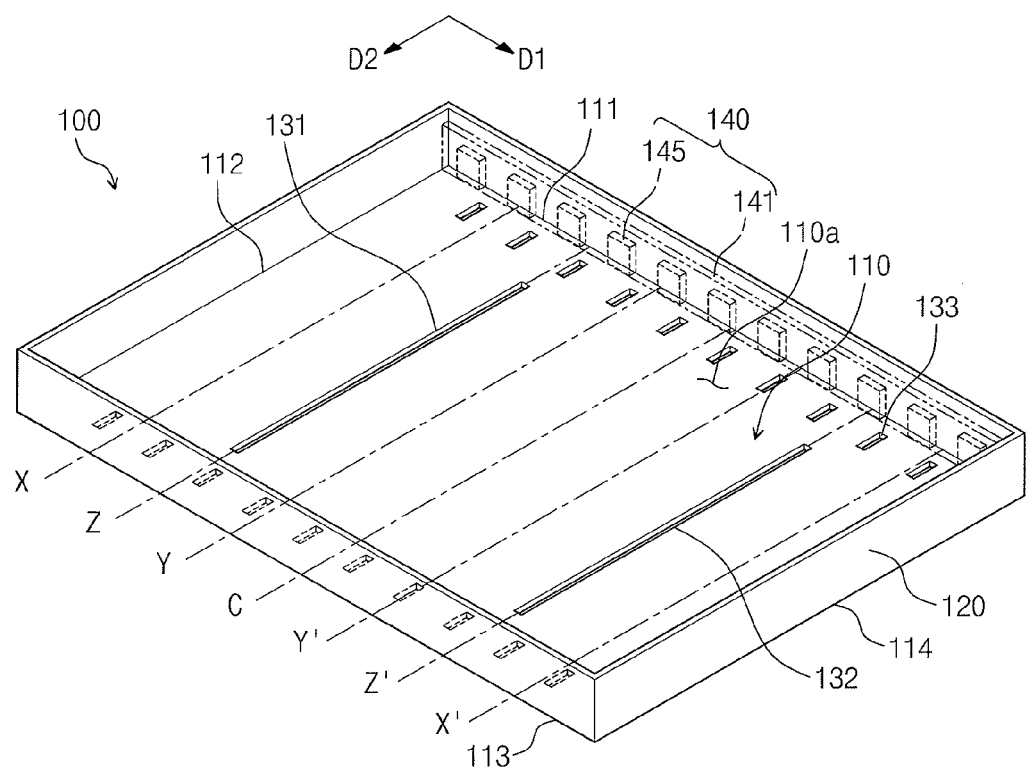

A bottom chassis of a display device according to an example embodiment of the inventive concept will be described with reference to FIG. 3. FIG. 3 is a perspective view of a bottom chassis according to an example embodiment of the inventive concept. For concise description, a previously described element may be identified by a similar or identical reference number without repeating an overlapping description thereof.

Referring to FIG. 3, the light source portion 140 of the display device may be disposed on the inner side surface 120a of the sidewall portion 120 adjacent to the bottom surface 110a, along the first direction D1. For example, the light source portion 140 may be disposed on the inner side surface 120a of the sidewall portion 120 adjacent to the first side 111 and/or the third side 113.

The deformation-preventing region of the bottom chassis 100 may include, for example, the first and second deformation-preventing regions 131 and 132 and a plurality of third deformation-preventing regions 133, each of which is shaped like a slit penetrating the bottom portion 110. In an embodiment, the third deformation-preventing regions 133 may be formed, for example, to have a length shorter than those of the first and second deformation-preventing regions 131 and 132.

The first, second and third deformation-preventing regions 131, 132 and 133 may be formed parallel to the second direction D2. For example, the first direction D1 may be perpendicular to longitudinal directions of the first, second and third deformation-preventing regions 131, 132 and 133, and the second direction D2 may be parallel to the longitudinal directions of the first, second and third deformation-preventing regions 131, 132 and 133.

The first and second deformation-preventing regions 131 and 132 may be spaced apart from the light source portion 140. One of the first and second deformation-preventing regions 131 and 132 may be formed, for example, between the central line C of the bottom portion 110 and the second side 112, and the other of the first and second deformation-preventing regions 131 and 132 may be formed between the central line C of the bottom portion 110 and the fourth side 114.

The third deformation-preventing regions 133 may be formed adjacent to the light source portion 140 to penetrate the bottom portion 110. For example, the third deformation-preventing regions 133 may be formed adjacent to the light source portion 140, compared with the first and second deformation-preventing regions 131 and 132 which are formed further away from the light source portion 140 than the third deformation-preventing regions 133. In an embodiment, the third deformation-preventing regions 133 may be respectively disposed, for example, between pairs of the light sources 145 and may be one-dimensionally arranged along the first direction D1, as shown in FIG. 3.

Figure 4:
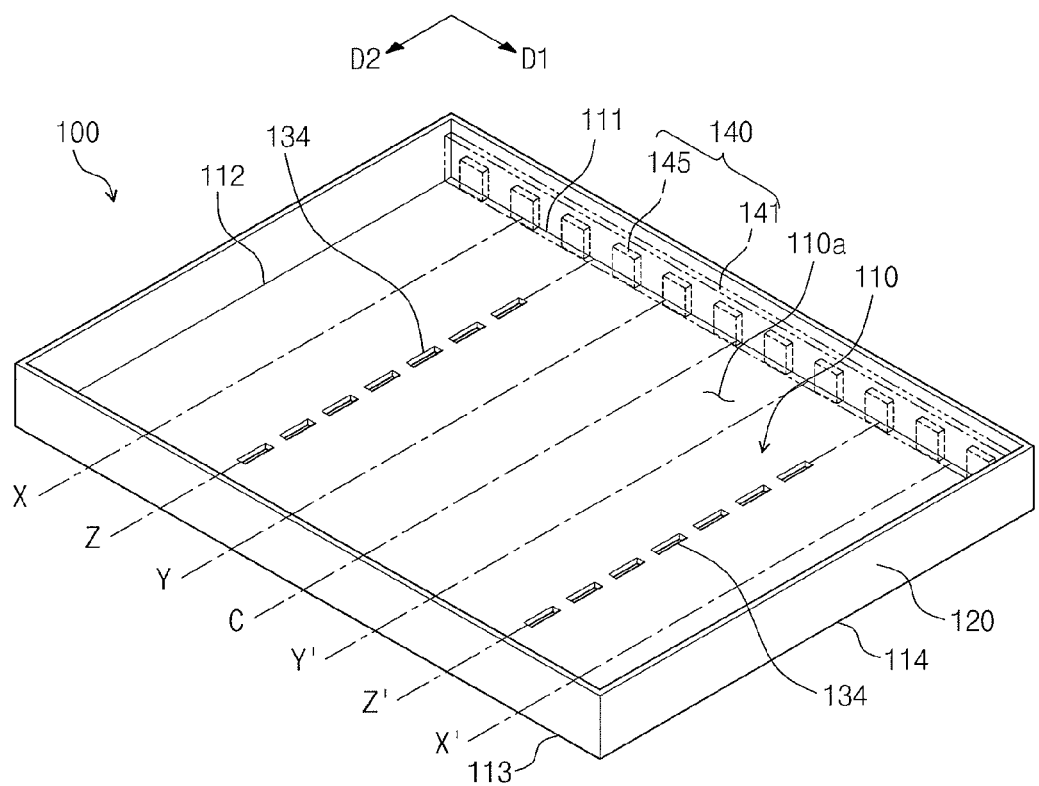

A bottom chassis of a display device according to an example embodiment of the inventive concept will be described with reference to FIG. 4. FIG. 4 is a perspective view of a bottom chassis according to an example embodiment of the inventive concept. For concise description, a previously described element may be identified by a similar or identical reference number without repeating an overlapping description thereof.

Referring to FIG. 4, the deformation-preventing region of the bottom chassis 100 may include, for example, a plurality of fourth deformation-preventing regions 134 arranged along the second direction D2. Each of the fourth deformation-preventing regions 134 may be shaped like, for example, a slit penetrating the bottom portion 110. In an embodiment, the fourth deformation-preventing regions 134 may be arranged in, for example, at least one row (for example, in two rows) in a direction parallel to the second direction D2. Here, the first direction D1 may be, for example, perpendicular to a longitudinal direction of the fourth deformation-preventing regions 134, and the second direction D2 may be parallel to the longitudinal direction of the fourth deformation-preventing regions 134.

In an embodiment, some of the fourth deformation-preventing regions 134 may be arranged, for example, in a row between the central line C of the bottom portion 110 and the second side 112, and others of the fourth deformation-preventing regions 134 may be arranged in a row between the central line C of the bottom portion 110 and the fourth side 114.

Figure 5:
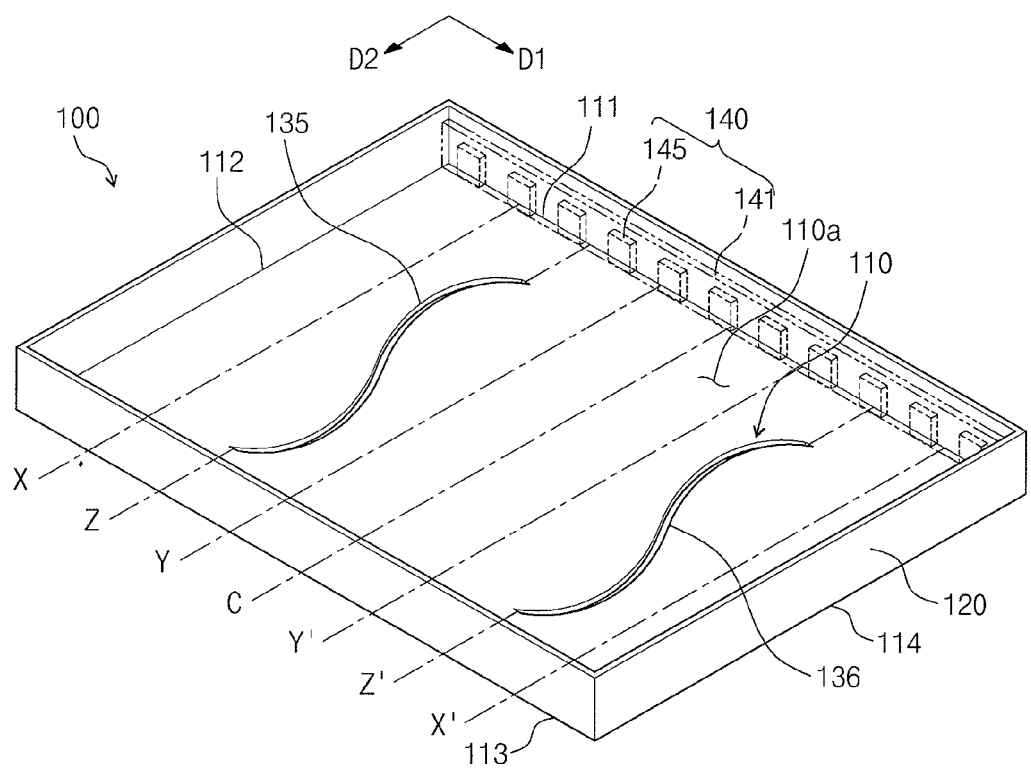

A bottom chassis of a display device according to an example embodiment of the inventive concept will be described with reference to FIG. 5. FIG. 5 is a perspective view of a bottom chassis according to an example embodiment of the inventive concept. For concise description, a previously described element may be identified by a similar or identical reference number without repeating an overlapping description thereof.

Referring to FIG. 5, the deformation-preventing region of the bottom chassis 100 may include, for example, fifth and sixth deformation-preventing regions 135 and 136 penetrating the bottom portion 110. In an embodiment, each of the fifth and sixth deformation-preventing regions 135 and 136 may be shaped like, for example, a curved slit.

For example, a distance between one side of the fifth deformation-preventing region 135 and the second side 112 may be shorter than a distance between the second side 112 and a third line Z which crosses the bottom chassis 100 in a direction parallel to the second direction D2 and which is spaced apart from the second side 112 by one-fourth of the length of the first side 111. In addition, a distance between another side of the fifth deformation-preventing region 135 and the second side 112 may be greater than the distance between the second side 112 and the third line Z.

A distance between one side of the sixth deformation-preventing region 136 and the fourth side 114 may be, for example, shorter than a distance between the fourth side 114 and a sixth line Z' which crosses the bottom chassis 100 in a direction parallel to the second direction D2 and which is spaced apart from the fourth side 114 by one-fourth of the length of the first side 111. Moreover, a distance between another side of the sixth deformation-preventing region 136 and the fourth side 114 may be, for example, greater than the distance between the fourth side 114 and the sixth line Z'.

Figure 6:
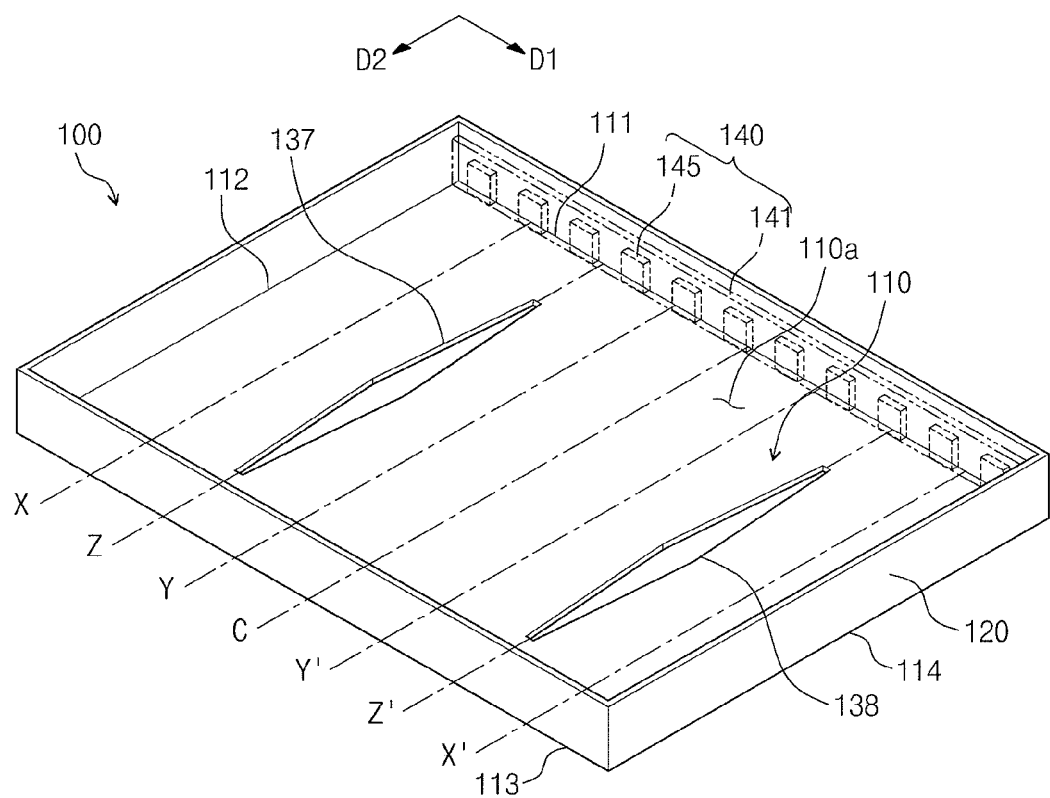

A bottom chassis of a display device according to an example embodiment of the inventive concept will be described with reference to FIG. 6. FIG. 6 is a perspective view of a bottom chassis according to an example embodiment of the inventive concept. For concise description, a previously described element may be identified by a similar or identical reference number without repeating an overlapping description thereof.

Referring to FIG. 6, the deformation-preventing region of the bottom chassis 100 may include, for example, seventh and eighth deformation-preventing regions 137 and 138 penetrating the bottom portion 110. In an embodiment, each of the seventh and eighth deformation-preventing regions 137 and 138 may be formed, for example, to have a tapered shape. For example, a distance from the second side 112 to one of the seventh and eighth deformation-preventing regions 137 and 138 may vary along the second direction D2.

For example, the seventh deformation-preventing region 137 may be formed between the first line X which crosses the bottom chassis 100 in a direction parallel to the second direction D2 and the second line Y which crosses the bottom chassis 100 in a direction parallel to the second direction D2, and endpoints of the seventh deformation-preventing region 137 adjacent to the first and third sides 111 and 113 may be positioned on the third line Z which crosses the bottom chassis 100 in a direction parallel to the second direction D2. However, the remaining region of the seventh deformation-preventing region 137 may be formed, for example, to have a width greater than that of the endpoints of the seventh deformation-preventing region 137. For example, the seventh deformation-preventing region 137 may be formed to be a slit having a diamond shape extending along the second direction D2.

The eighth deformation-preventing region 138 may be formed, for example, between the fourth line X' which crosses the bottom chassis 100 in a direction parallel to the second direction D2 and the fifth line Y' which crosses the bottom chassis 100 in a direction parallel to the second direction D2, and endpoints of the eighth deformation-preventing region 138 adjacent to the first and third sides 111 and 113 may be positioned on the sixth line Z' which crosses the bottom chassis 100 in a direction parallel to the second direction D2. However, the remaining region of the eighth deformation-preventing region 138 may be formed to, for example, have a width greater than that of the endpoints of the eighth deformation-preventing region 138. For example, the eighth deformation-preventing region 138 may be formed to be a slit having a diamond shape extending along the second direction D2.

In other words, the first direction D1 may be, for example, perpendicular to a longitudinal direction of the seventh and eighth deformation-preventing regions 137 and 138, and the second direction D2 may be, for example, parallel to the longitudinal direction of the seventh and eighth deformation-preventing regions 137 and 138. Furthermore, in an embodiment, the widths of the seventh and eighth deformation-preventing regions 137 and 138 may be, for example, greater at a center thereof than at the endpoints thereof.

Hereinafter, a display device including the bottom chassis according to an example embodiment of the inventive concept will be described with reference to FIG. 7.

Figure 7:
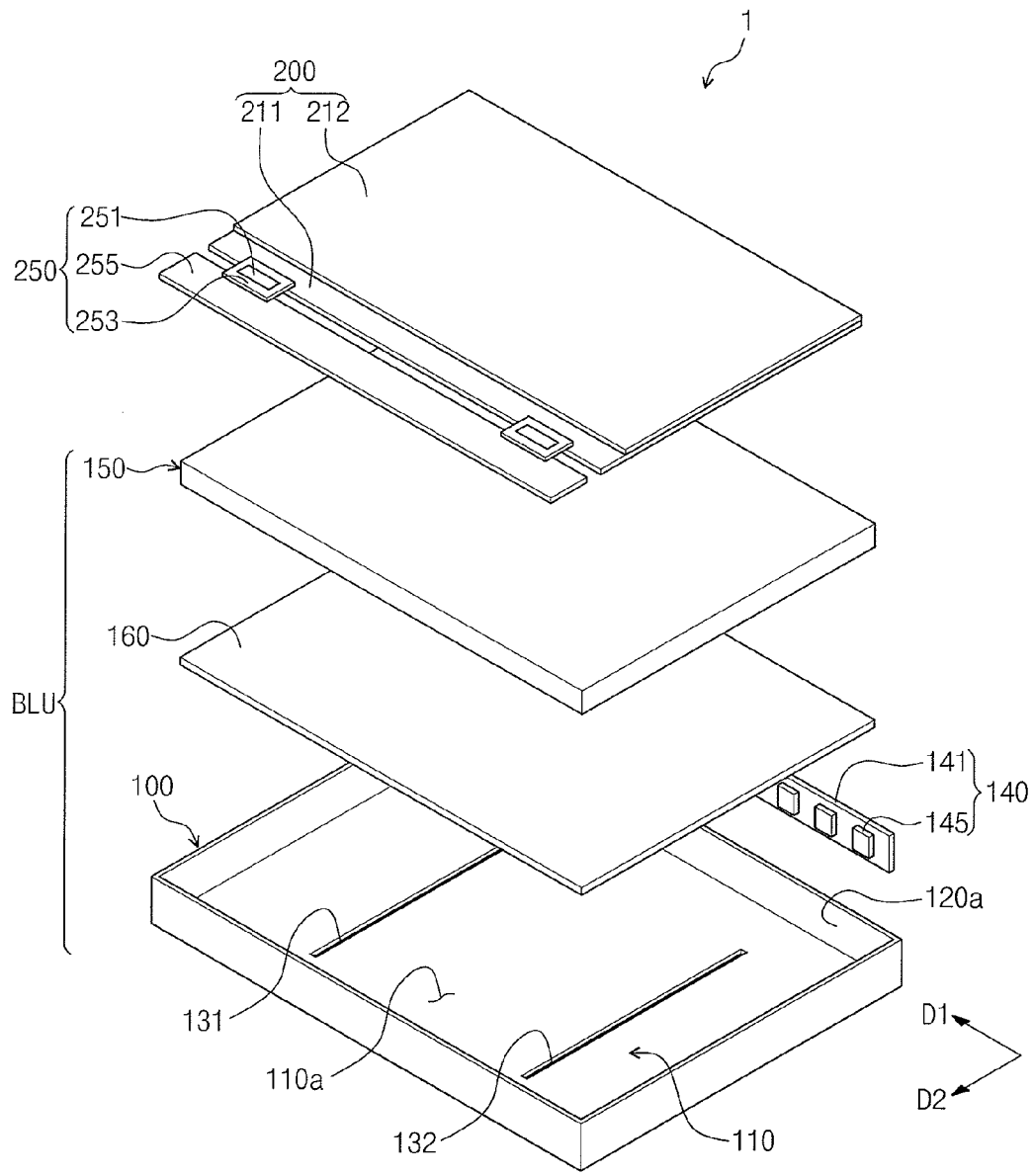
FIG. 7 is an exploded perspective view illustrating a display device according to an example embodiment of the inventive concept.

FIG. 7 is an exploded perspective view illustrating a display device according to an example embodiment of the inventive concept. A bottom chassis included in the display device may be configured to have the same technical features as one of the bottom chassis described with reference to FIGS. 1 through 6, and thus a discussion in further detail of the same elements in common with the bottom chassis of FIGS. 1 through 6 will be omitted for brevity.

Referring to FIG. 7, a display device 1 may include, for example, a display panel 200 displaying an image, a light source portion 140 configured to provide a light to the display panel 200, a driving portion 250 controlling the display panel 200, and a bottom chassis 100, in which the display panel 200, the light source portion 140 and the driving portion 250 are equipped. The display device 1 may include, for example, a reflective sheet 160 and a light guide plate 150 sequentially stacked between the display panel 200 and the bottom chassis 100. The display device 1 may further include, for example, a top chassis (not shown) configured to fasten the display panel 200 to the bottom chassis 100.

The display panel 200 may include, for example, an array substrate 211 provided with a plurality of pixels, an opposite substrate 212 facing the array substrate 211, and a liquid crystal layer (not shown) interposed between the array substrate 211 and the opposite substrate 212.

Gate lines (not shown) and data lines (not shown) may be disposed on the array substrate 211 to cross each other. The array substrate 211 may include pixel regions defined by the gate lines and the data lines, and each of the pixels may be provided on a corresponding one of the pixel regions.

Each of the pixels may include a thin film transistor (TFT) and a pixel electrode. A gate electrode of the thin film transistor may be connected to a corresponding one of the gate lines, and a source electrode of the thin film transistor may be connected to a corresponding one of the data lines, and a drain electrode of the thin film transistor may be connected to the pixel electrode.

The opposite substrate 212 may include a plurality of RGB color pixels, each of which is provided on a corresponding one of the pixels, and a common electrode (not shown) is disposed on the RGB color pixels to face the pixel electrode. Alternatively, the RGB color pixels may be formed on the array substrate 211 instead of the opposite substrate 212. The liquid crystal layer may include a liquid crystal material whose orientation can be changed by an electric field generated between the pixel electrode and the common electrode. For example, the liquid crystal layer may be configured to change an optical transmittance of the light provided from the light source portion 140.

The light source portion 140 may include, for example, a plurality of light sources 145 and a bar 141 equipped with the light sources 145. The light sources 145 may be, for example, arranged spaced apart from each other on the bar 141. In an embodiment, the light sources 145 may be, for example, light emitting diodes (LEDs). Other light sources 145 which may be used include, for example, an external electrode fluorescent lamp (EEFL), a hot cathode fluorescent lamp (HCFL) and a cold cathode fluorescent lamp (CCFL). The bar 141 may be, for example, one of a flexible printed circuit (FPC), double FPC, and metal printed circuit board (MPCB). The light sources 145 may be applied with a driving voltage from the bar 141.

The driving portion 250 may include, for example, a driving chip 251 providing a driving signal to the display panel 200, a flexible circuit substrate 253 equipped with the driving chip 251, and a printed circuit board 255 electrically connected to the display panel 200 via the flexible circuit substrate 253. The driving chip 251 may be configured to generate the driving signal for operating the display panel 200 in response to an external signal. The external signal may be provided from the printed circuit board 255 and may include image signals, control signals and operating voltages.

The display panel 200 may be configured to display an image using a gate signal and a data signal. The driving chip 251 may include a data driver (not shown) configured to change the image signal into the data signal and send the data signal to the display panel 200. A gate driver (not shown) generating the gate signal may be, for example, directly formed on the array substrate 211 or be mounted on the flexible circuit substrate 253. For example, a gate driver may be formed on the array substrate 211 or be mounted on the flexible circuit substrate 253 by one of a COB (Chip On Board) mounting method, a TAB (Tape Automated Bonding) mounting method, and a COG (Chip On Glass) mounting method.

The bottom chassis 100 may include, for example, a bottom portion 110 and a sidewall portion 120 and provide a space capable of containing the display panel 200, the light source portion 140 and the driving portion 250. The light source portion 140 may be disposed, for example, on the inner side surface 120a of the sidewall portion 120 to face a sidewall of the display panel 200, and the light sources 145 may be arranged in a row along the first direction D1. The bottom chassis 100 may be one of those depicted by FIGS. 1 through 6. The bottom chassis 100 may include, for example, at least one material selected from the group consisting of, for example, aluminum (Al), aluminum alloys, stainless steel, or steel electro galvanized cold-rolled coil (SECC). The bottom chassis 100 may be configured to prevent elements therein from being damaged by an external impact.

The light guide plate 150 may be disposed within the bottom chassis 100, and for example, be positioned below the display panel 200. The light guide plate 150 may have, for example, a tetragonal plate shape and be formed of a transparent refractive material. For example, the light guide plate 150 may be formed of a resin based material such as polymethylmethacrylate (PMMA), a polyethylene terephthalate (PET) resin, a polycarbonate (PC) resin, a cyclic olefin copolymer (COC) resin, and a polyethylene naphthalate (PEN) resin. The light guide plate 150 may be configured to receive a light, which is generated from the light sources 145 through a side (hereinafter, incident surface) thereof adjacent to the bar 141, deflect the received light, and emit the deflected light through a top surface of the light guide plate 150.

The reflective sheet 160 may be provided, for example, below the light guide plate 150 to reflect a light leaking from the light guide plate 150 and return the reflected light to the light guide plate 150. The reflective sheet 160 is able to reduce an optical loss of the light guide plate 150. The reflective sheet 160 may be formed of, for example, a reflective material, such as polyethylene terephthalate (PET) or aluminum. Alternatively, the reflective sheet 160 may include other materials such as, for example, polybutylene terephthalate (PBT) or a resin such as polycarbonate (PC) blended in polyethylene terephthalate (PET) or polybutylene terephthalate (PBT).

Although not depicted in the drawings, an optical sheet (not shown) may be provided on the light guide plate 150. The optical sheet may include, for example, at least one prism sheet concentrating a light emitted from the light guide plate 150 and at least one diffusion sheet diffusing the light. Due to the presence of the prism sheet, the device can exhibit increased front brightness.

In addition, the top chassis (not shown) may be equipped to face the bottom chassis 100 and press the display panel 200, thereby preventing the display panel 200 from being deviated from the bottom chassis 100.

Hereinafter, a bottom chassis and a display device including the same according to a comparative example will be described with reference to FIGS. 8 and 9.

Figure 8:
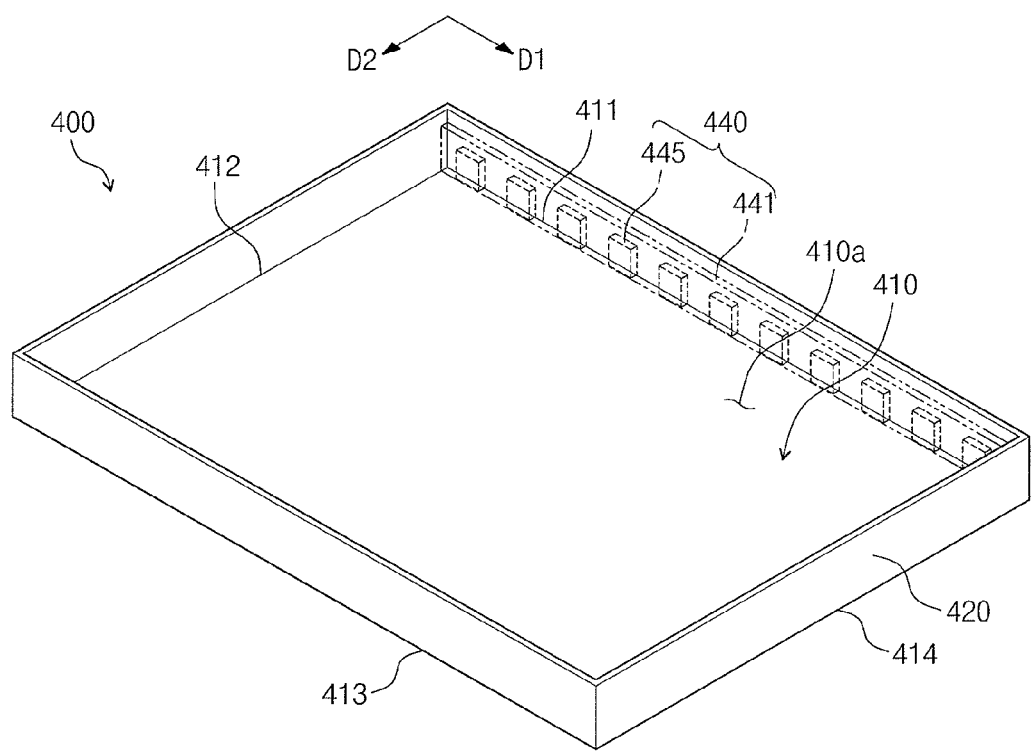
FIG. 8 is a perspective view of a bottom chassis according to a comparative example.
Figure 9:
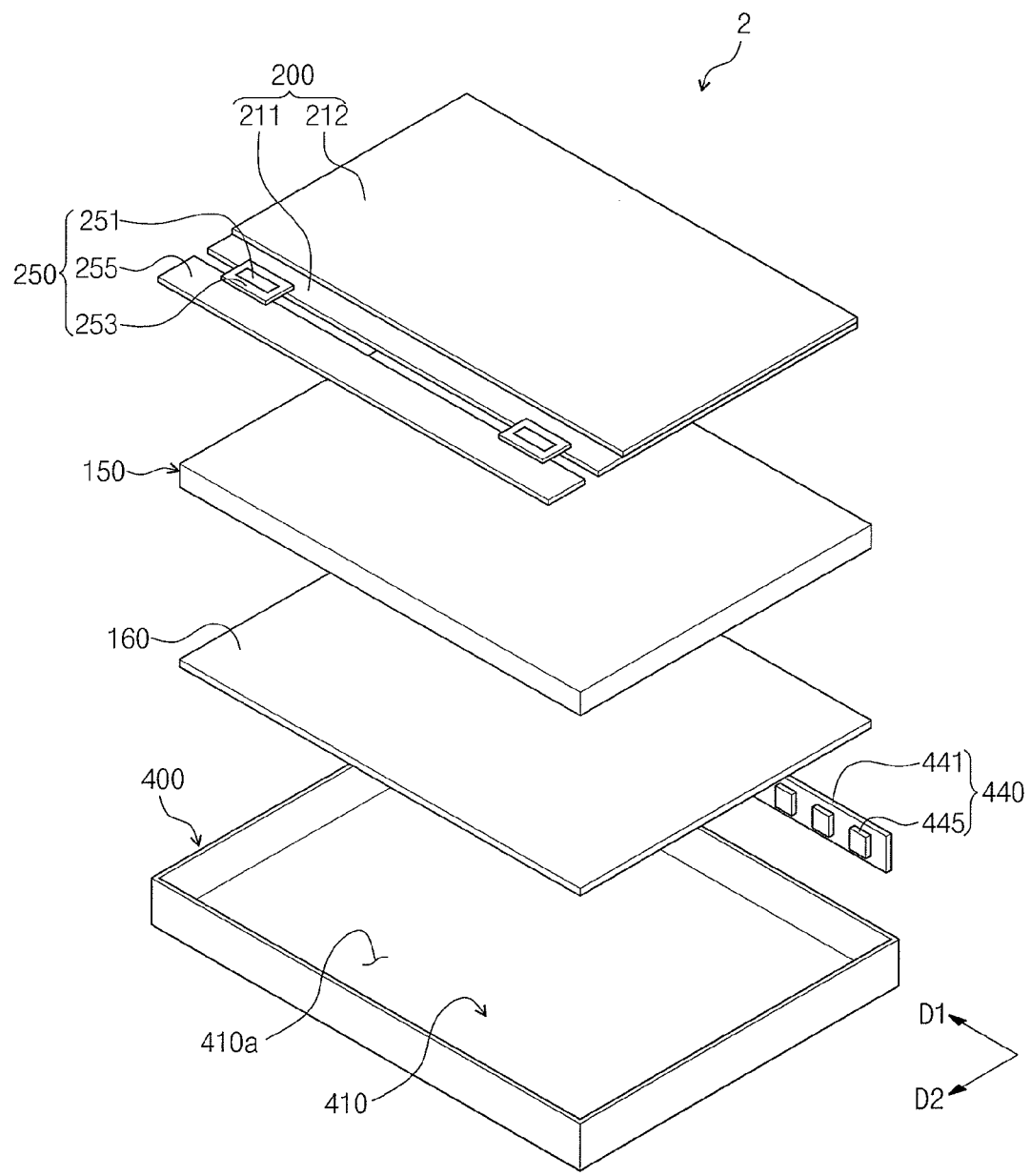
FIG. 9 is an exploded perspective view of a display device according to a comparative example.

FIG. 8 is a perspective view of a bottom chassis according to a comparative example, and FIG. 9 is an exploded perspective view of a display device according to a comparative example. Except for the bottom chassis to be described with reference to FIG. 8, the display device of FIG. 9 may be configured to have the same technical features as the display device of FIG. 7. Thus, a repetitive discussion of the same reference elements in common with the display device of FIG. 7 will be omitted for brevity.

Referring to FIGS. 8 and 9, the display device 2 may include a bottom chassis 400 which may include, for example, a bottom portion 410 and a sidewall portion 420. A bottom surface 410a of the bottom portion 410 may be formed to have, for example, a rectangular shape with four sides, and the sidewall portion 420 may be connected to the sides of the bottom portion 410. The sidewall portion 420 may include an inner side surface adjacent to the bottom surface 410a. The bottom portion 410 may include, for example, a first side 411 extending along the first direction D1 and a second side 412 extending along the second direction D2 crossing the first direction D1. In addition, the bottom portion 410 may include, for example, a third side 413 parallel to the first side 411 and a fourth side 414 parallel to the second side 412. Here, unlike the bottom chassis 100 according to an example embodiment of the inventive concept, the bottom chassis 400 according to the comparative example may be configured not to have a slit.

The light source portion 440 of a display device may be, for example, disposed on the inner side surface of the sidewall portion 420 along the first direction D1. The light source portion 440 may include, for example, a plurality of light sources 445 and a bar 441 provided with the light sources 445. The light sources 445 may be arranged spaced apart from each other along the first direction D1.

Figure 10:
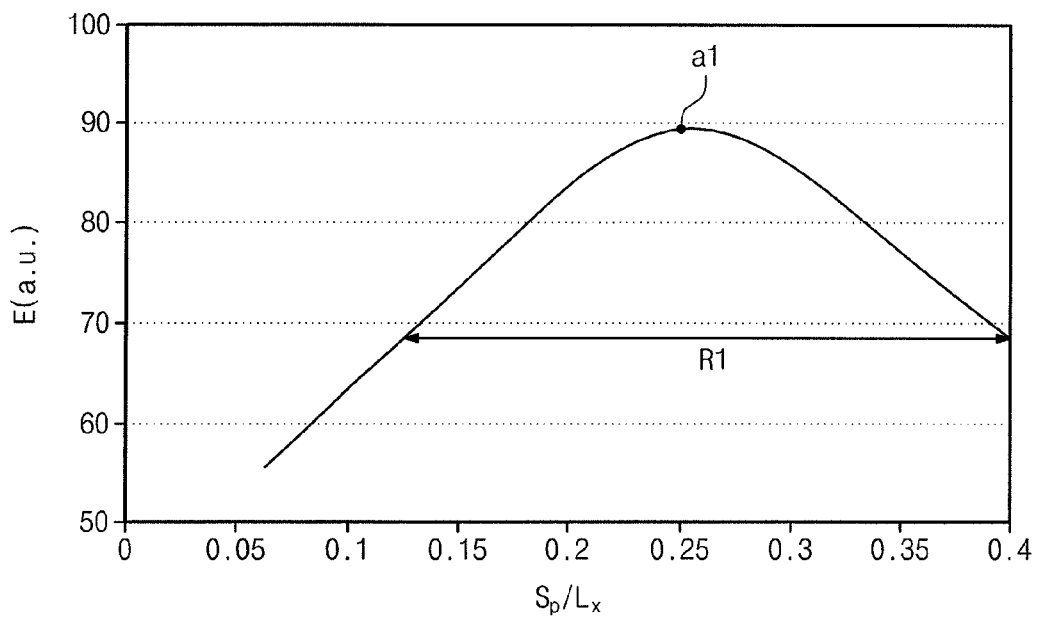
FIGS. 10 through 12 are graphs provided to describe a design of a slit according to an example embodiment of the inventive concept.
Figure 11:
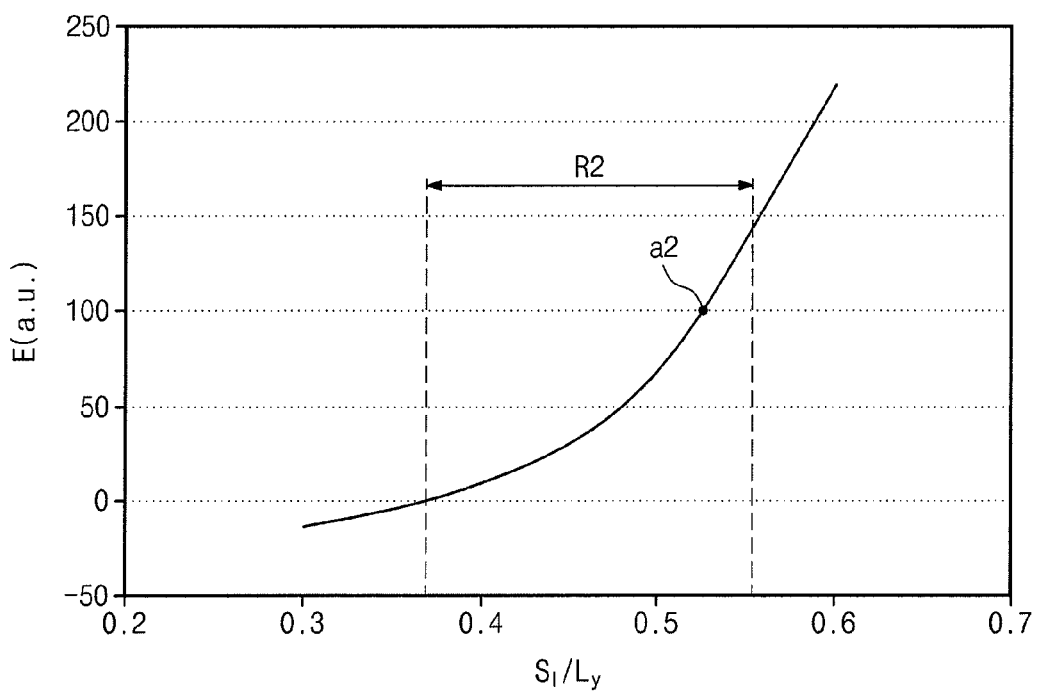
Figure 12:
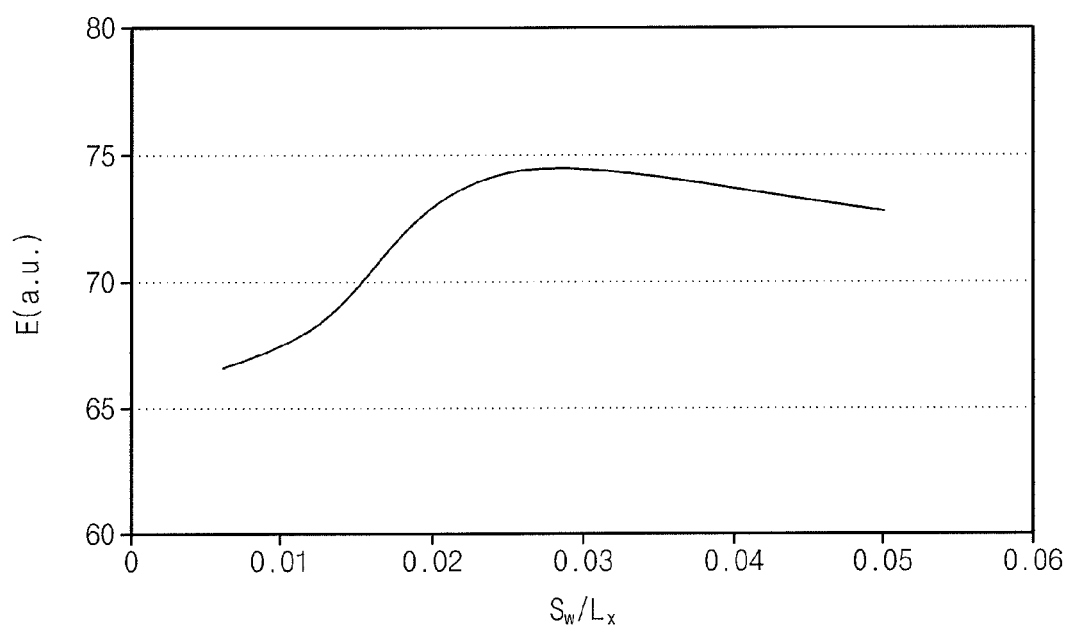

Technical aspects to be described with reference to FIGS. 10 through 12 may be used to design a slit penetrating the bottom chassis according to an example embodiment of the inventive concept. FIGS. 10 through 12 are graphs provided to describe a design of a slit according to an example embodiment of the inventive concept.

In FIGS. 10 through 12, an effectiveness index E representing a degree of deformation of the bottom chassis is given along the y axis. Here, the degree of deformation of the bottom chassis is used to represent, for example, how much the bottom chassis is distorted by a spatial variation in temperature thereof. For example, it can be said that the more the degree of deformation, the more the bottom chassis is distorted. In the meantime, the effectiveness index E of 100 represents that there is no deformation of the bottom chassis (e.g., prior to applying a thermal stress). In other words, the closer the effectiveness index is to 100, the smaller the deformation resulting to the bottom chassis. If the effectiveness index is greater or smaller than 100, the bottom chassis may exhibit increased deformation.

Let's suppose that the first direction D1 is parallel to a direction on which the light source is disposed. Then, the effectiveness index E can be given by, for example, $$E = \frac{\left(\frac{\delta_s}{\delta_c}\right)_{slit} - \left(\frac{\delta_s}{\delta_c}\right)_{NONE}}{1 - \left(\frac{\delta_s}{\delta_c}\right)_{NONE}} \times 100 \quad \text{[Equation 1]}$$

where $\delta_s$ and $\delta_c$ denote displacements of the bottom portion of the bottom chassis. In more detail, $\delta_c$ represents the displacement of a corner of a surface, on which the light source is provided, measured along the first direction D1, and $\delta_s$ represents the displacement of a center of a surface, which is not provided with the light source, measured along the first direction D1. The corner of the surface, on which the light source is provided, is an end portion of a side parallel to the slit, and the center of the surface, which is not provided with the light source, is a center of the side parallel to the slit. The subscript "NONE" denotes the case without any slit, while the subscript "slit" denotes the case with the slit.

In FIG. 10, the x axis represents Sp/Lx, where Sp is a space between the slit and the second side 112 or the fourth side 114 (e.g., in FIG. 1) and Lx is a length the first side 111 or the third side 113. Here, the space Sp is given with respect to one of the second side 112 and the fourth side 114. As illustrated in FIG. 10, the values of the Sp/Lx and the effectiveness index E each initially increase, and then the values of the Sp/Lx and the effectiveness index E each peak at point a1. Subsequent to peaking at point a1, the values of the Sp/Lx and the effectiveness index E each then decrease as illustrated in FIG. 10. As the effectiveness index E is closest to 100 at the point a1, the bottom chassis exhibits the minimized deformation at the point a1. In this sense, the space Sp may be selected within a first range R1 including the point a1.

In FIG. 11, the x axis represents Sl/Ly, where Sl is a length of the slit and Ly is a length of the second side 112 or the fourth side 114 (e.g., in FIG. 1). As shown in FIG. 11, the values of the Sl/Ly and the effectiveness index E each increase. As the effectiveness index E is closest to 100 at the point a2, the bottom chassis exhibits the minimized deformation at the point a2. In this sense, the length of the slit Sl may be selected within a second range R2 including the point a2. For example, a length of the slit 130 may be in the range of about 35% to about 55% of the length of the second side 112.

In FIG. 12, the x axis represents Sw/Lx, where Sw is a width of the slit and Lx is a length of the first side 111 or the third side 113 (e.g., in FIG. 1). As shown in FIG. 12, the values of Sw/Lx and the effectiveness index E each increase, and then gradually vary. There is no significant variation of the effectiveness index E, in the typical width range of the slit in use.

Figure 13:
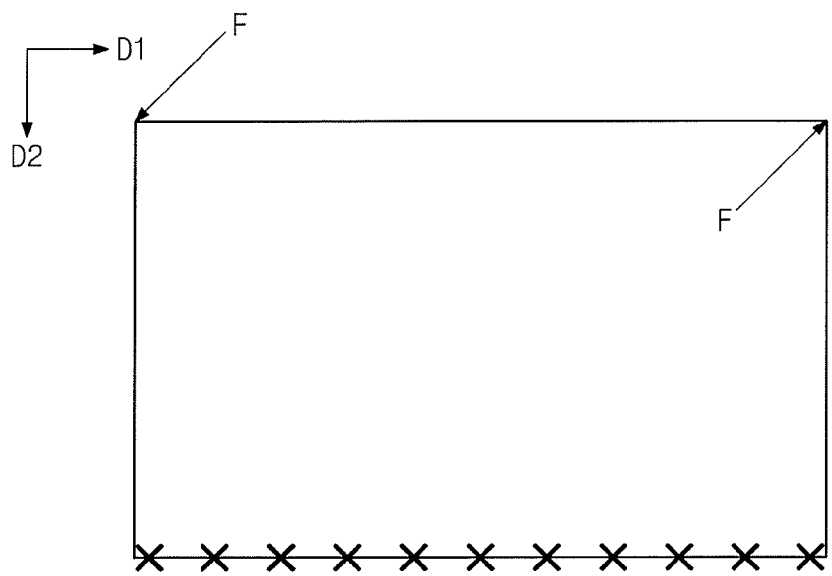
FIG. 13 is a schematic diagram provided to explain rigidity characteristics of a bottom chassis according to an example embodiment of the inventive concept.

Hereinafter, rigidity characteristics of the bottom chassis according to an example embodiment of the inventive concept will be explained in a comparative manner with reference to FIG. 13. FIG. 13 is a schematic diagram provided to explain rigidity characteristics of the bottom chassis according to an example embodiment of the inventive concept.

Referring to FIG. 13, an external force was exerted on the bottom chassis to evaluate rigidity characteristics thereof. Here, one of two sides of the bottom chassis parallel to the first direction D1 (depicted by X) was fixed, while antiparallel external forces F with the same magnitude were exerted on two corners of the other side, respectively.

The bottom chassis with the slit (in FIG. 2) had a distortion degree of about 100, while the bottom chassis without any slit (in FIG. 5) had a distortion degree of about 99.27. From this result, it can be said that rigidity characteristics of the bottom chassis can be increased by the slit.

Hereinafter, characteristics of the display device including the bottom chassis according to an example embodiment of the inventive concept will be described in a comparative manner with reference to FIGS. 1 through 9.

If the display device 1 or 2 is operated for a long time, a thermal energy, transferred from a light energy emitted from the light source portion 140, may be accumulated in the bottom chassis 100 or 400. As a result, a temperature of the bottom chassis is higher in a region adjacent to the light source portion 140 than in a center region spaced apart from the light source portion 140. This means that the temperature is lower at a center of the second side 112 or 412 or the fourth side 114 or 414 than at the region adjacent to the light source portion 140. Due to the difference in temperature, a region of the bottom chassis 100 or 400 adjacent to the light source portion 140 may be thermally expanded more than the center region of the bottom chassis 100 or 400.

For example, the bottom chassis 100 or 400 may be expanded along the first direction D1, due to the difference in temperature. For example, the region of the bottom chassis 100 or 400 adjacent to the light source portion 140 may be more extended more than other regions of the bottom chassis 100 or 400 (e.g., the center region thereof). If the bottom chassis 100 or 400 is extended beyond a critical value, the exterior of the bottom chassis may be permanently deformed (e.g., twisted). In other words, the bottom chassis 400 of FIG. 8 may have a spatially varying deformation characteristic, and this may lead to a deformation of the bottom chassis 400 (e.g., twist).

By contrast, the display device of FIG. 7 includes, by way of example only, the bottom chassis 100 having the slits of the first and second deformation-preventing regions 131 and 132 described with reference to FIG. 1. However, the bottom chassis 100 described in connection with any one of FIGS. 1 through 6 may be included in the display device of FIG. 7, such that a thermally-induced mechanical stress exerted on the bottom chassis 100 can be dispersed by virtue of the presence of one or more of the slits of the first through eight deformation regions 131, 132, 133, 134, 135, 136, 137 and 138 disposed in the bottom portion 110 of the bottom chassis 100, thereby preventing or suppressing the bottom chassis 100 from being deformed.

Figure 14:
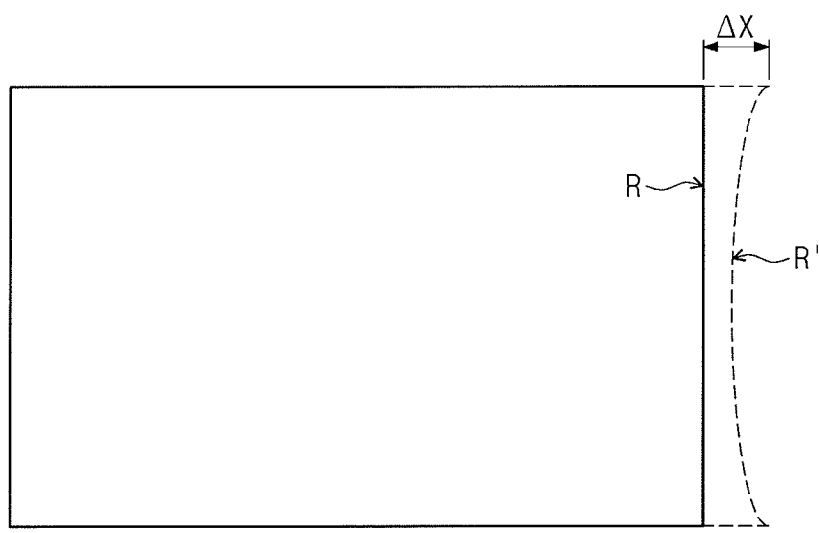
FIG. 14 is a plan view provided to schematically describe deformation of the bottom chassis according to a comparative example and an exemplary embodiment of the inventive concept.

Deformation characteristics of the bottom chassis according to an example embodiment of the inventive concept will be described in more detail with reference to FIGS. 1A, 8, 14 and 15. FIG. 14 is a plan view provided to schematically describe deformation of a bottom chassis according to a comparative example and an exemplary embodiment of the inventive concept, and FIG. 15 is a graph numerically showing a parameter $\Delta X$ of FIG. 14.

In FIG. 14, a line R shows a profile of the fourth side 114 or 414 of the bottom chassis, to which energy from the light source portion is not applied. A dotted line R' does exemplarily show an expanded profile of the fourth side 114 or 414 of the bottom chassis, to which energy from the light source portion is applied. Here, a parameter $\Delta X$ represents how much the bottom chassis is expanded by the thermal stress.

Figure 15:
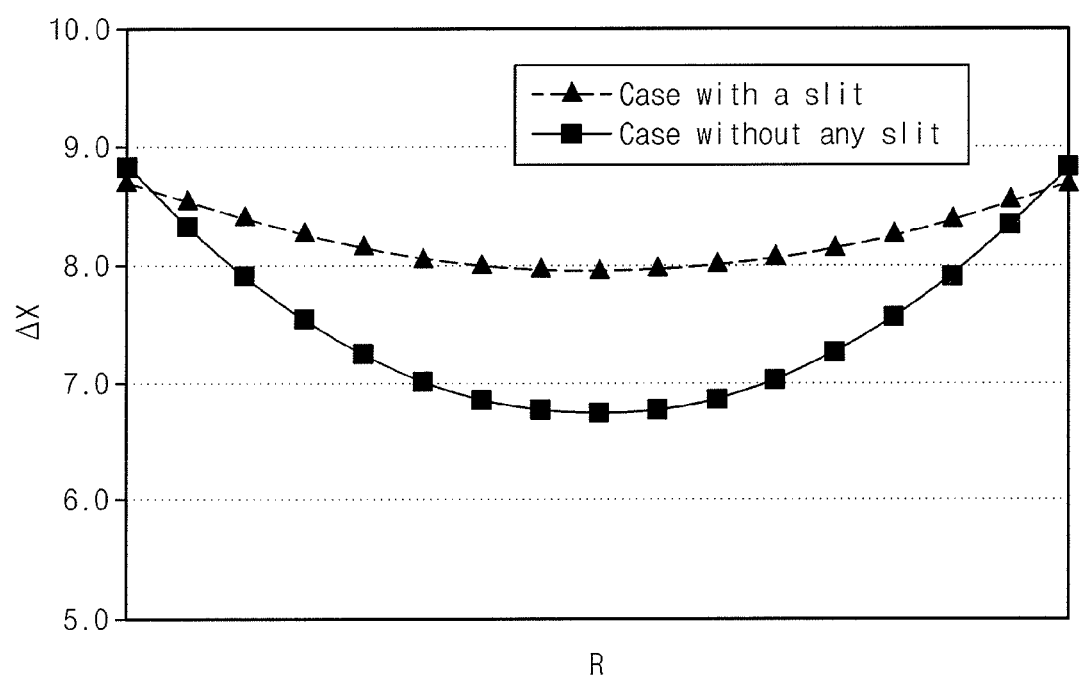
FIG. 15 is a graph numerically showing a parameter ΔX of FIG. 14

In the graph of FIG. 15, the x axis represents the fourth side R of the bottom chassis, and the y axis represents an expansion degree ($\Delta X$) of the bottom chassis in the first direction.

The symbol "▲" represents the experimental result obtained from a sample with the slit (e.g., of FIG. 2), and the symbol ■ represents the experimental result obtained from another sample without any slit (e.g., of FIG. 8). Two samples were tested under the same condition.

Referring to FIGS. 14 and 15, the spatial variation was smaller for the sample with the slit (e.g., of FIG. 2) than for the sample without any slit (e.g., of FIG. 8). This means that the sample with the slit (e.g., of FIG. 2) is less deformed, compared with the sample without any slit (e.g., of FIG. 8).

Hereinafter, optical characteristics (especially, black view) of the display devices of FIGS. 8 and 1 will be explained in a comparative manner. Here, the black view means an image displayed by a display device in a light-blocking mode. The display device of FIG. 1A exhibited a substantially uniform black view property, while the display device of FIG. 8 exhibited a partially-stained black view property, such as light-leakage phenomena. From a quantitative point of view, a light-leakage property of the display device of FIG. 1A was increased by about 86% or more, compared with the display device of FIG. 8.

In addition, the display device of FIG. 7 and the display device of FIG. 9 were tested in terms of inflow of extraneous substance. This test was performed in a visual inspection manner, and any extraneous substance was not found from both of the display devices of FIGS. 7 and 9.

According to an example embodiment of the inventive concept, even when the display device is operated for a relatively long time, it is possible to reduce a thermally-induced mechanical stress exerted on the bottom chassis, due to the presence of the slit. In other words, it is possible to prevent or suppress the exterior of the bottom chassis from being deformed which in turn may suppress the light-leakage of the backlight unit and/or the display device, thereby increasing the reliability of the display device. In addition, the slit can be formed by changing a design for the bottom chassis irrespective of the material used to form the bottom chassis which in turn may reduce the fabrication cost of the bottom chassis and/or the display device.

Having described exemplary embodiments of the inventive concept, it is further noted that it is readily apparent to those of reasonable skill in the art that various modifications may be made without departing from the spirit and scope of the invention which is defined by the metes and bounds of the appended claims.

What is claimed is:

1. A bottom chassis, comprising:
   a bottom portion having at least one deformation-preventing region penetrating therethrough;
   a sidewall portion connected to at least one side of the bottom portion; and
   a light-shielding member, comprising one or more light shielding tapes, disposed on an outer surface of the bottom chassis and covering the at least one deformation-preventing region and configured to prevent light from penetrating the at least one deformation-preventing region,
   wherein the bottom portion includes a first side extending along a first direction and a second side extending along a second direction crossing the first direction, and
   wherein the first direction is substantially perpendicular to a longitudinal direction of the at least one deformation-preventing region, and the second direction is substantially parallel to the longitudinal direction of the at least one deformation-preventing region.

2. The bottom chassis of claim 1, wherein the bottom portion further includes a third side facing the first side and a fourth side facing the second side, and wherein the at least one deformation-preventing region includes at least one slit located between a center point of the bottom portion and the second side, and/or at another point located between the center point of the bottom portion and the fourth side, and wherein the center point of the bottom portion is spaced apart from the second side by about half a length of the first side.

3. The bottom chassis of claim 2, wherein the at least one slit is located between a first line which crosses the bottom chassis in a direction substantially parallel to the second direction and a second line which crosses the bottom chassis in a direction substantially parallel to the second direction, wherein the first line is spaced apart from the second side by about one-eighth of the length of the first side and the second line is spaced apart from the second side by about two-fifths of the length of the first side.

4. The bottom chassis of claim 2, wherein the at least one deformation-preventing region includes a first deformation-preventing region and a second deformation-preventing region,
   wherein the first deformation-preventing region is a slit located between a first line which crosses the bottom chassis in a direction substantially parallel to the second direction and a second line which crosses the bottom chassis in a direction substantially parallel to the second direction, wherein the first line is spaced apart from the second side by about one-eighth of the length of the first side and the second line is spaced apart from the second side by about two-fifths of the length of the first side, and
   wherein the second deformation-preventing region is a slit located between a third line which crosses the bottom chassis in a direction substantially parallel to the second direction and a fourth line which crosses the bottom chassis in a direction substantially parallel to the second direction, wherein the third line is spaced apart from the fourth side by about one-eighth of the length of the first side and the fourth line is spaced apart from the fourth side by about two-fifths of the length of the first side.

5. A backlight unit, comprising:
   a bottom chassis; and
   a light source portion disposed in the bottom chassis,
   wherein the bottom chassis comprises:
   a bottom portion having at least one deformation-preventing region penetrating therethrough;
   a light-shielding member, comprising one or more light shielding tapes, disposed on an outer surface of the bottom chassis and covering the at least one deformation-preventing region and configured to prevent light of the light source portion from penetrating the at least one deformation-preventing region, and
   a sidewall portion connected to at least one side of the bottom portion,
   wherein the bottom portion includes a first side extending along a first direction and a second side extending along a second direction crossing the first direction, and
   wherein the first direction is parallel to a longitudinal direction of the light source portion, and the second direction is substantially parallel to the longitudinal direction of the at least one deformation-preventing region.

6. The backlight unit of claim 5, wherein the bottom portion further includes a third side facing the first side and a fourth side facing the second side, and wherein the at least one deformation-preventing region includes at least one slit located between a center point of the bottom portion and the second side, and/or at another point located between the center point of the bottom portion and the fourth side, and wherein the center point of the bottom portion is spaced apart from the second side by about half a length of the first side.

7. The backlight unit of claim 6, wherein the at least one slit is located between a first line which crosses the bottom chassis in a direction substantially parallel to the second direction and a second line which crosses the bottom chassis in a direction substantially parallel to the second direction, wherein the first line is spaced apart from the second side by about one-eighth of the length of the first side and the second line is spaced apart from the second side by about two-fifths of the length of the first side.

8. The backlight unit of claim 6, wherein the deformation-preventing region includes a first deformation-preventing region and a second deformation-preventing region, wherein the first deformation-preventing region is located between a first line which crosses the bottom chassis in a direction substantially parallel to the second direction and a second line which crosses the bottom chassis in a direction substantially parallel to the second direction, wherein the first line is spaced apart from the second side by about one-eighth of the length of the first side and the second line is spaced apart from the second side by about two-fifths of the length of the first side, and wherein the second deformation-preventing region is located between a third line which crosses the bottom chassis in a direction substantially parallel to the second direction and a fourth line which crosses the bottom chassis in a direction substantially parallel to the second direction, wherein the third line is spaced apart from the fourth side by about one-eighth of the length of the first side and the fourth line is spaced apart from the fourth side by about two-fifths of the length of the first side.

9. The backlight unit of claim 8, wherein the bottom chassis further comprises a plurality of third deformation-preventing regions, each of which is shaped like a slit and has a length shorter than a length of each of the first and second deformation-preventing regions.

10. The backlight unit of claim 9, wherein the third deformation-preventing regions are disposed between the first and second deformation-preventing regions and the first side.

11. The backlight unit of claim 6, wherein the at least one deformation-preventing region comprises a plurality of slit-shaped deformation-preventing regions arranged in at least one row in the bottom portion of the bottom chassis along a direction substantially parallel to the second direction.

12. The backlight unit of claim 6, wherein the at least one deformation-preventing region is shaped like a curved slit, wherein a distance between one side of the deformation-preventing region and the second side is shorter than a distance between the second side and a first line which crosses the bottom chassis in a direction substantially parallel to the second direction and which is spaced apart from the second side by about one-fourth of the length of the first side, and wherein a distance between another side of the at least one deformation-preventing region and the second side is greater than the distance between the second side and the first line.

13. The backlight unit of claim 6, wherein distances from endpoints of the at least one deformation-preventing region to the second side are different from distances from other points of the at least one deformation-preventing region to the second side.

14. The backlight unit of claim 13, wherein the first direction is substantially perpendicular to a longitudinal direction of the deformation-preventing region, and wherein a width of the deformation-preventing region is greater at a center portion thereof than at the endpoints thereof.

15. The backlight unit of claim 5, wherein the first direction is substantially perpendicular to a longitudinal direction of the at least one deformation-preventing region, and wherein a length of the at least one deformation-preventing region is in the range of about 35% to about 55% of a length of the second side.

16. The backlight unit of claim 5, wherein the bottom portion further comprises a light-shielding member covering the at least one deformation-preventing region.

17. The backlight unit of claim 5, wherein the light source portion is disposed on an inner surface of the sidewall portion of the bottom chassis along the first direction.

18. A display device, comprising:
a bottom chassis;
a display panel disposed in the bottom chassis; and
a light source portion disposed in the bottom chassis and facing a sidewall of the display panel,
wherein the bottom chassis comprises;
a bottom portion having at least one deformation-preventing region penetrating therethrough;
a sidewall portion connected to at least one side of the bottom portion; and
a light-shielding member, comprising one or more light shielding tapes, disposed on an outer surface of the bottom chassis and covering the at least one deformation-preventing region and configured to prevent light from penetrating the at least one deformation-preventing region,
wherein the bottom portion includes a first side extending along a first direction and a second side extending along a second direction crossing the first direction, and
wherein the first direction is substantially perpendicular to a longitudinal direction of the at least one deformation-preventing region, and the second direction is substantially parallel to the longitudinal direction of the at least one deformation-preventing region.

19. A bottom chassis, comprising:
a bottom portion having a tetragonal shape and which includes a first side extending along a first direction, a second side extending along a second direction crossing the first direction, a third side parallel to the first side and a fourth side parallel to the second side, wherein the bottom portion has a first slit and a second slit penetrating therethrough, wherein the first slit is located between a center point of the bottom portion and the second side of the bottom portion and the second slit is located between the center point of the bottom portion and the fourth side of the bottom portion and wherein the first and second slits are spaced apart from the first side and the third side by substantially a same distance as each other;
a sidewall portion connected to the first side, the second side, the third side, and the fourth side of the bottom portion; and
a plurality of light shielding tapes disposed on an outer surface of the bottom chassis and covering the first and the second slits, and wherein the first direction is substantially perpendicular to a longitudinal direction of the first and second slits and the second direction is substantially parallel to the longitudinal direction of the first and second slits.

20. The bottom chassis of claim 19, wherein the first and second slits each have a diamond shape.

21. A backlight unit, comprising:
a bottom chassis; and
a light source portion disposed in the bottom chassis, wherein the bottom chassis comprises:
a bottom portion having at least one deformation-preventing region penetrating therethrough;

a light-shielding member, comprising one or more light shielding tapes, disposed on an outer surface of the bottom chassis and covering the at least one deformation-preventing region and configured to prevent light of the light source portion from penetrating the at least one deformation-preventing region, and a sidewall portion connected to at least one side of the bottom portion, wherein the bottom portion includes a first side extending along a first direction and a second side extending along a second direction crossing the first direction, and wherein the first direction is substantially perpendicular to a longitudinal direction of the at least one deformation-preventing region, and the second direction is substantially parallel to the longitudinal direction of the at least one deformation-preventing region.

* * * * *